United States Patent [19]

Daghe et al.

[11] Patent Number: 4,717,178

[45] Date of Patent: Jan. 5, 1988

[54] FRANGIBLE COUPLING FOR BARREL SECTIONS OF A FIRE HYDRANT

[75] Inventors: Joseph L. Daghe; Gary L. Bouc; Carl E. Floren, all of Decatur, Ill.

[73] Assignee: Mueller Co., Decatur, Ill.

[21] Appl. No.: 869,987

[22] Filed: Jun. 3, 1986

[51] Int. Cl.$^4$ .............................................. F16L 35/00
[52] U.S. Cl. ............................................. 285/4; 403/2
[58] Field of Search ................. 285/2, 3, 4; 403/2; 137/797, 681

[56] References Cited

U.S. PATENT DOCUMENTS

| | | | |
|---|---|---|---|
| 1,684,572 | 9/1928 | Boosey | 285/4 |
| 2,017,600 | 10/1935 | Lofton | 285/2 |
| 2,020,365 | 11/1935 | Lofton | 285/2 |
| 3,331,397 | 7/1967 | Mueller et al. | 285/2 X |
| 3,738,390 | 6/1973 | Luckenbill | 785/2 X |

Primary Examiner—Dave W. Arola
Attorney, Agent, or Firm—Cushman, Darby & Cushman

[57] ABSTRACT

A flangible ring, for securing together the adjacent flanged ends of the upper and lower barrel sections of a fire hydrant, has two weakening grooves therein instead of the usual one. One of the grooves is conventional and located in one face of the ring just inside the circular array of bolt holes in the ring. The other weakening groove is formed in the other face of the ring and is of greater mean diameter but of smaller, width and depth than the first groove. Preferably the sides of the other groove are straight in radial section, disposed at an angle of the order of 60° to the face of the ring and an extension of the inner side thereof intersects the intersection of the bottom of the larger groove with a side thereof.

20 Claims, 5 Drawing Figures ic # FRANGIBLE COUPLING FOR BARREL SECTIONS OF A FIRE HYDRANT

FIELD OF THE INVENTION

This invention relates to improvements in frangible couplings for the upper and lower barrel sections of fire hydrants and, more particularly, to a frangible coupling which will break more uniformly and under less impact load than those heretofore.

BACKGROUND OF THE INVENTION

It has long been known to make fire hydrants with upper and lower barrel sections, the latter being buried and commonly connected to a shoe which contains the main hydrant valve operable by a stem extending upwardly through the barrel sections for connection with the usual operating nut at the top of the upper barrel section. The barrel sections are secured together with frangible coupling means and the stem is made in two sections connected together with a frangible or otherwise disengageable or bendable coupling means. Thus, if the hydrant is subjected to a lateral impact or blow, as being struck by a vehicle, the barrel sections' frangible coupling means breaks and likewise the stem coupling means breaks or gives way without, or with minimum, damage to the barrel sections and to the main valve which will remain closed. The hydrant is then easily repaired by replacing the coupling means for the barrel sections and the stem sections.

Examples of such hydrants are shown in U.S. Pat. Nos. 2,017,600, 2,020,365 and 3,331,397, the disclosures of which are incorporated by reference herein.

The shoe or lower barrel section of a fire hydrant usually is almost completely buried in the ground both to avoid freezing of the water below the main valve and to minimize the damage thereto by a lateral impact on the upper barrel section. Even though the aforedescribed frangible coupling means minimizes damage to the lower barrel section by a lateral impact on the upper, it has in the past been the practice to block the lower barrel section, e.g. reinforce or compact the earth surrounding the lower barrel section, to even further lessen the possibility of damage to the lower barrel section by causing the frangible coupling means to break more readily on impact and thus lessen the forces transmitted to the lower barrel section from the upper. Of course, blocking involves expense.

BRIEF DESCRIPTION OF THE INVENTION

Thus, it is an object of this invention to lessen dependency upon blocking to minimize damage to the lower barrel section of a fire hydrant on an impact against the upper section.

It is another object to attain the foregoing object by lessening the force necessary to break the usual frangible barrel coupling means.

It is a further object of this invention to provide an improved inexpensive frangible barrel coupling ring which not only will break on lesser impact load but also will fracture more uniformly circumferentially thereabout.

The foregoing objects are accomplished by providing the usual frangible barrel section coupling ring which has a circular weakening groove in one face thereof with a smaller circular weakening groove in the other face of the ring that is coaxial with but of smaller median diameter and depth than those of the first-mentioned groove.

Other objects and advantages of the invention will be apparent from the following description and accompanying drawings in which:

DETAILED DESCRIPTION OF THE INVENTION

Figure 1:
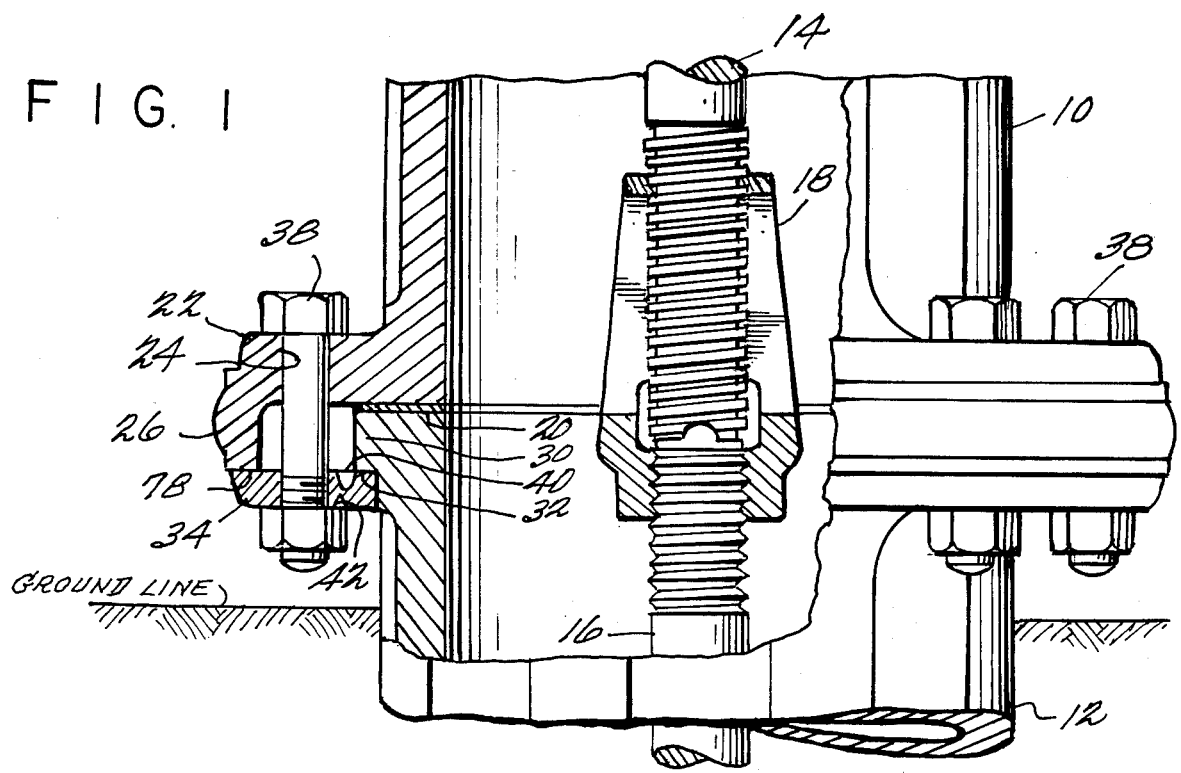
FIG. 1 is a fragmentary elevational view, partly in vertical section of a fire hydrant embodying this invention.
Figure 2:
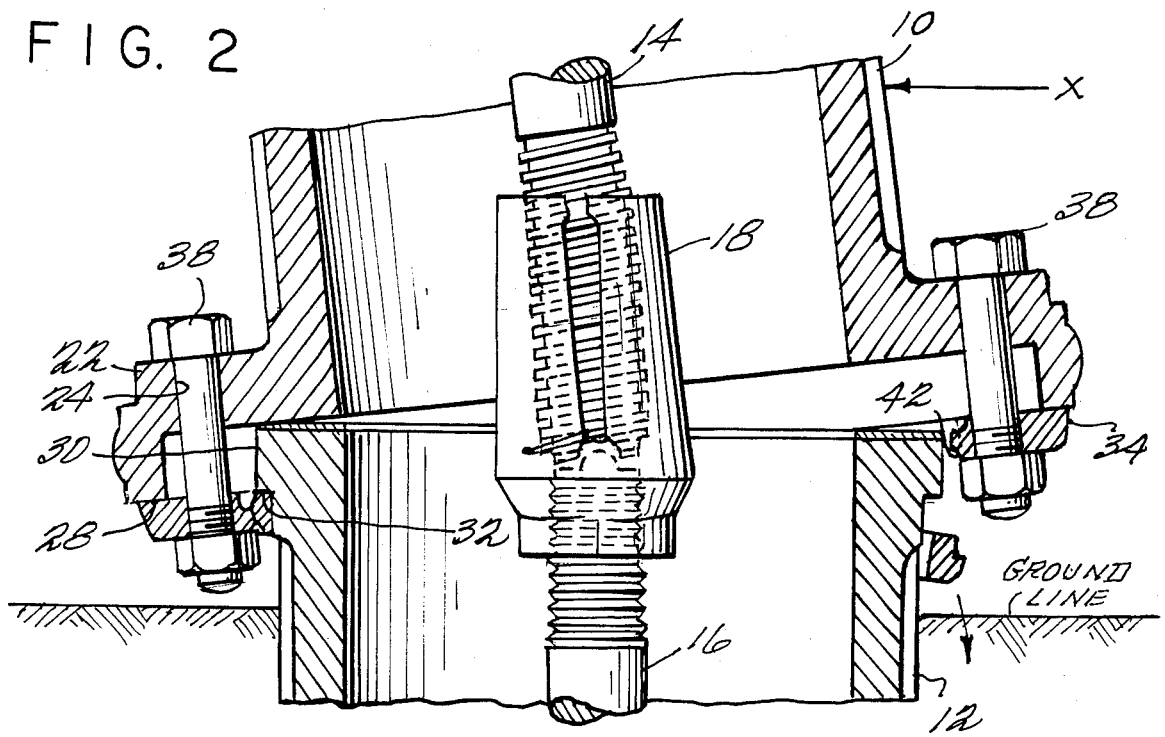
FIG. 2 is a view corresponding to FIG. 1 but showing the position the parts assume when subject to a rupturing blow.

Referring now to the drawings there are shown, in FIGS. 1 and 2, the upper and lower tubular barrel sections 10 and 12 of a typical fire hydrant. Extending vertically through the sections is the usual valve stem having upper and lower sections 14 and 16 connected by coupling means 18 which will yield or become disengaged readily on a lateral impact against the upper barrel section 10, as shown by the arrow X in FIG. 2. The abutting ends of the barrel sections 10 and 12 have the usual sealing gasket 20 interposed therebetween. The lower end of the upper barrel section 10 has a peripheral flange 22 of relatively large diameter provided with a coaxial circular array of uniformly circumferentially spaced bolt holes 24. The flange 22 may have a depending peripheral portion 26 terminating in a downward-facing flat annular abutment surface 28. The upper end of the lower barrel section 12 also has a peripheral flange 30 of less diameter than that of the flange 22. The flange 30 on the lower barrel section 12 also has a downward-facing flat annular abutment surface 32 of smaller outside diameter than the inside diameter of the abutment surface 28 on the flange 22 of the upper barrel section 10 so that the annular abutment surfaces are spaced apart radially.

Figure 3:
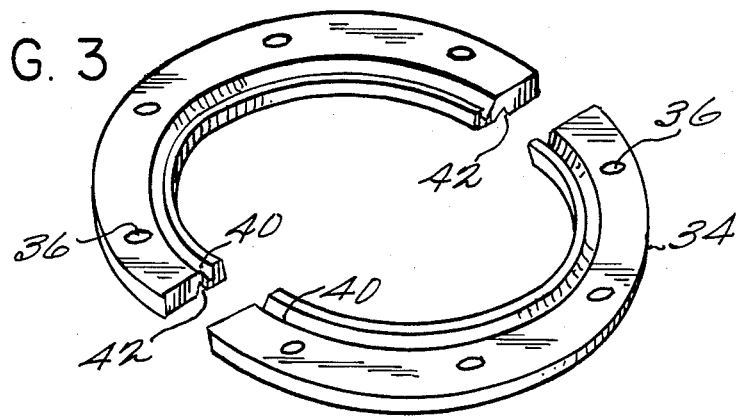
FIG. 3 is a perspective view of the coupling ring shown in FIG. 1.

The upper and lower barrel sections 10 and 12 are secured together by a tangible generally flat coupling ring 34 which may be made in two semicircular sections, as shown best in FIG. 3, for ready assembly about the lower barrel section 12. The ring 34 bears against the abutment surfaces 28 and 32, spans the radial gap therebetween and has a circular array of bolt holes 36 aligned with those 24 in the flange 22 of the upper barrel section 10 for the reception of bolts 38 for securing the barrel sections together. The ring 34 has a circular coaxial weakening groove 40 in its upper face spaced radially inward from the bolt holes 36 and with the inner edge of the groove being located just outside the outer edge of the abutment surface 32 on the lower barrel section 12. Typically, the outside diameter of such a ring 34 is larger than the outside diameter of the barrel and in a 5¼" size hydrant is 13", the inside diameter 9-¼", the groove width at its mouth is ⅜", the groove depth is ⅜" and the groove has sides that are straight in radial section and a concavely curved bottom with a radius of 3/32".

The foregoing construction is conventional and well illustrated in the aforementioned U.S. Pat. No. 2,017,600. In actual practice it has been found that with such a construction when the barrel sections are mounted in a hydraulic test fixture, it requires a side load on the upper barrel section 10, about 19" above the ground line, typically of about 6300 p.s.i. to cause the ring to fracture and rupture the coupling between the barrel sections. Surprisingly the fracture line, in radial section, does not propagate from the bottom of the groove perpendicular to the lower face of the ring but at an angle thereto toward the bolt holes 36 and even into the latter. Further, the fracture line wanders from a true circle because of local anomalies in strength.

Figure 4:
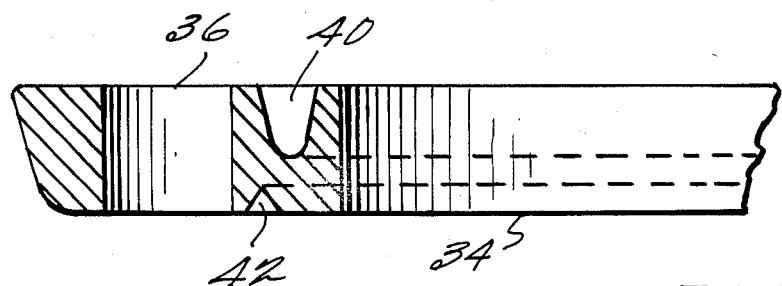
FIG. 4 is an enlarged fragmentary radial sectional view of the coupling ring shown in FIG. 3.

The improved ring 34 has another groove 42 in its other or lower face. The groove 42 preferably has straight sides, in radial section, and is of lesser mouth width and depth than the groove 40. An extension of the inner side of the groove 42 preferably intersects the curved bottom of the groove 40 and also the inner side is at an angle of about 60° to the lower face of the ring 34. As shown best in FIG. 4, the groove may be V-shaped in radial section with the mean diameter thereof being greater than that of the groove 40. In actual practice, it has been found that the fracture line of the ring 25 seems to propagate from the intersection of the curved bottom of the groove 40 with a straight side thereof to the bottom of the groove 42 and is more uniformly circular. Typically, the groove 42 may be of the order of ⅛" in depth.

In actual practice, it also has been found that the lateral load required to fracture the ring 34, under the same conditions described above for testing a conventional ring, is of the order of 5600 p.s.i.

Figure 5:
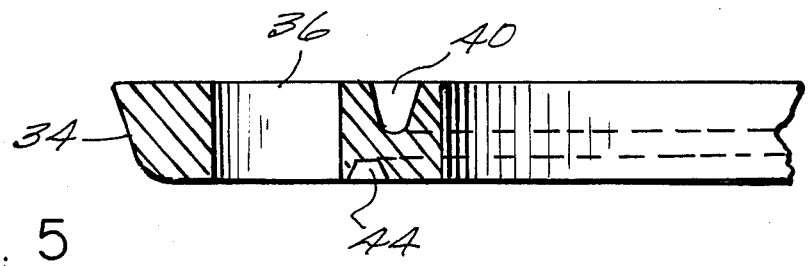
FIG. 5 is a view corresponding to FIG. 4 showing a modified form of the invention.

Referring now to FIG. 5 of the drawings, there is shown a modification of the invention wherein the smaller groove 44 has a flat bottom with a width of the order of ⅛". The groove 44 has a depth of about ⅛" and also sides which are straight in radial section and disposed at an angle of the order of 60° to the surface of the ring 34. This modification of the invention even further lowers the load necessary to fracture the ring 34, typically being of the order of 4400 p.s.i.

While the invention has been illustrated and described as having the ring forming the lower part of the frangible coupling between the two barrel sections, it will be realized that the ring can form the upper part of the frangible coupling as shown, for example, in the aforementioned U.S. Pat. No. 2,020,365.

Still further, while the larger groove has been shown and described as being in that face of the ring which faces the larger flange on the barrel sections, the locations of the grooves may be reversed so that the larger groove faces away from the larger flange as shown, for example, in the aforementioned U.S. Pat. No. 3,331,397.

Although the frangible ring may be made in two semi-circular sections, with the grooves 40, 42 and 44 cast or machined therein, the ring may be made in one piece with a pair of diametric weakening grooves so that the ring may be broken or cut apart along those grooves into two semi-circular halves for assembly to the hydrant barrel sections. If such a one-piece construction is cast, both grooves 40 and 44 preferably will have concavely curved bottoms.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

We claim:

1. A frangible ring for securing together the adjacent ends of the upper and lower barrel sections of a fire hydrant, said ends having peripheral flanges of a different diameters comprising:
   a generally flat circular coupling member having a coaxial annular array of bolt holes adjacent its outer periphery, alignable with corresponding bolt holes in the flange of larger diameter;
   a first annular coaxial weakening groove in one face of said coupling member spaced radially inward of said bolt holes; and
   a second annular weakening groove in the other face of said coupling member coaxial with said first groove, spaced radially inward of said bolt holes and radially overlapping said first groove.

2. The ring defined in claim 1 wherein the second groove is of greater mean diameter and smaller depth than the first groove.

3. The ring defined in claim 1 wherein the outer side of the second groove is straight in radial section.

4. The ring defined in claim 3 wherein the first groove has straight sides and a concavely curved bottom and an extension of the outer side of the second groove intersects the intersection of said bottom with a straight side of said first groove.

5. The ring defined in claim 4 wherein the outer side of the second groove lies at an angle of about 60° to the other face.

6. The ring defined in claim 1 wherein the first groove has a width and depth of the order of ⅛" and the second groove has a depth of the order of ⅛".

7. The ring defined in claim 1 wherein the second groove is generally V-shaped in radial section.

8. The ring defined in claim 1 wherein the second groove has a flat bottom.

9. The ring defined in claim 1 wherein the second groove has straight sides and a concavely curved bottom.

10. The ring defined in claim 1 comprising two semi-circular sections.

11. The ring defined in claim 1 comprising a one-piece construction having two diametric weakening grooves whereby said ring may be broken or cut apart along said diametric grooves into two semi-circular sections.

12. In a fire hydrant having upper and lower aligned barrel sections with flanged adjacent ends of different diameters and a split frangible coupling ring secured to the larger of said flanges by a circular array of bolts and overlying the other flange to secure said sections together, the ring being provided with a first coaxial circular weakening groove in one face thereof spaced radially inward of said array, the improvement comprising a second coaxial circular weakening groove in the other face of said ring spaced radially inward of said array and radially overlapping said first groove.

13. The ring defined in claim 12 wherein the second groove is of greater mean diameter and smaller depth than the first groove.

14. The improvement defined in claim 12 wherein the outer side of the second groove is straight in radial section.

15. The improvement defined in claim 14 wherein the first groove has straight sides and a concavely curved bottom and an extension of the outer side of the second groove intersects the intersection of said bottom with a straight side of said first groove.

16. The improvement defined in claim 12 wherein the outer side of the second groove lies at an angle of about 60° to the other face.

17. The improvement defined in claim 12 wherein the first groove has a width and depth of the order of ⅜″ and the second groove has a depth of the order of ⅛″.

18. The improvement defined in claim 12 wherein the second groove is generally V-shaped in radial section.

19. The improvement defined in claim 12 wherein the second groove has a flat bottom.

20. The ring defined in claim 12 wherein the second groove has straight sides and a concavely curved bottom.

* * * * *